United States Patent [19]

Roethlisberger

[11] 4,057,120

[45] Nov. 8, 1977

[54] FRONT WHEEL DRIVE AND SUSPENSION ARRANGEMENT

[75] Inventor: Jerry M. Roethlisberger, Bridgeport, Mich.

[73] Assignee: General Motors Corporation, Detroit, Mich.

[21] Appl. No.: 578,524

[22] Filed: May 19, 1975

[51] Int. Cl.$^2$ .................. B60K 17/30; B60K 17/34
[52] U.S. Cl. .................. 180/44 R; 280/667; 280/661
[58] Field of Search ........... 180/43 R, 43 A, 43 B, 180/43 C, 44 R; 280/96.2 R, 96.1, 96, 661, 667

[56] References Cited

U.S. PATENT DOCUMENTS

| 2,154,569 | 4/1939 | Hicks | 280/661 |
|---|---|---|---|
| 2,303,545 | 12/1942 | Graham | 280/667 |
| 2,772,596 | 12/1956 | Trussell | 280/96.2 B |
| 2,890,893 | 6/1959 | Laukhuff | 280/96.2 B |
| 3,048,232 | 8/1962 | O'Brien | 180/43 R |
| 3,162,262 | 12/1964 | Ordorica | 180/43 R |
| 3,212,597 | 10/1965 | Behles | 280/96.2 R X |
| 3,243,007 | 3/1966 | Berckhan | 180/43 R |
| 3,283,842 | 11/1966 | Watt | 180/43 R X |
| 3,481,436 | 12/1969 | Wilkowski | 180/44 R X |
| 3,856,323 | 12/1974 | Arning | 280/96.2 R |

Primary Examiner—John P. Silverstrim
Attorney, Agent, or Firm—John P. Moran

[57] ABSTRACT

A front wheel drive and suspension arrangement wherein drive train and independent suspension components are integrally mounted on a cross-member structure and adapted for mounting as a subassembly on the front portion of a vehicular frame.

2 Claims, 4 Drawing Figures

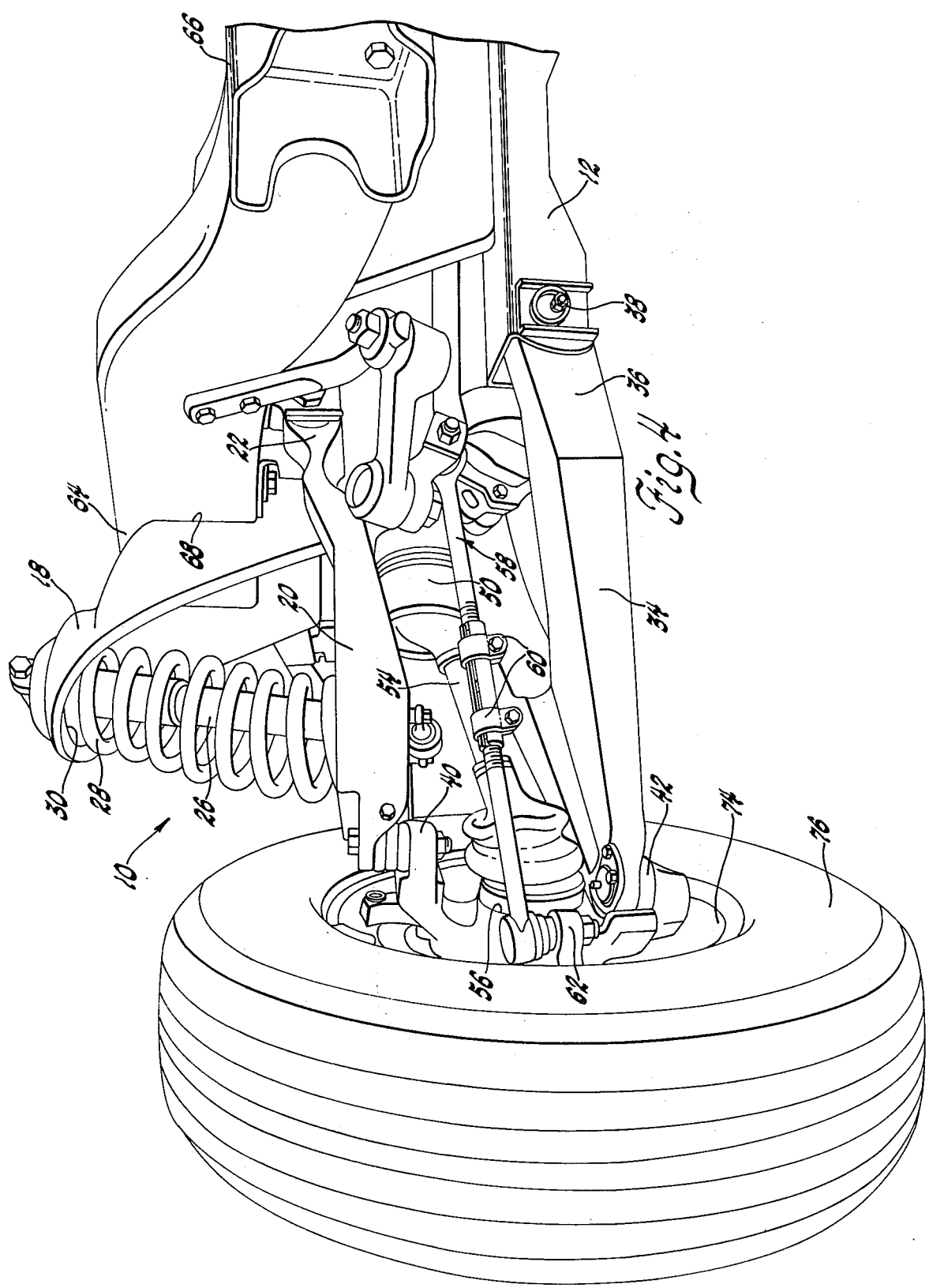

FRONT WHEEL DRIVE AND SUSPENSION ARRANGEMENT

The subassembly includes vertically spaced upper and lower laterally extended cross members interconnected by a centrally located strap member. A differential is mounted adjacent one side of the strap member with drive axles extending through the space between the cross members. A spring tower is mounted on each end of the upper cross member with mounting provisions formed thereon for mounting the subassembly to the frame.

This invention relates generally to independent front suspension systems and, more specifically, to a combined front suspension system and drivetrain package, especially for use on light trucks and/or recreational vehicles.

Heretofore, front wheel drive type light trucks and/or recreational vehicles have generally included a solid front axle and differential with non independent type suspension.

Accordingly, a general object of the invention is to provide an improved independent front suspension system incorporating drivetrain components therein for use on light trucks and/or recreational vehicles.

Another object of the invention is to provide a structural cross-member having drivetrain and independent suspension system components integrally mounted thereon, forming a subassembly which is adaptable to being mounted as a unit on a light truck and/or recreational vehicle frame, in lieu of a solid front axle therefor.

A further object of the invention is to provide a unitized front drive and independent front suspension subassembly mountable as a unit on a vehicular frame and including a front cross-member having an upper laterally extending support member welded thereon, a set of upper and lower control arms secured to respective ends of the cross-member and associated support member, spring means operatively connected to the control arms, and a differential mounted between the cross-member and upper support member with right and left drive means extending laterally therefrom to operatively connect through respective steering knuckles mounted on the outer ends of the upper and lower control arms for driving right- and left-hand wheels associated with the drive means.

These and other objects and advantages of the invention will be apparent when reference is made to the following description and accompanying drawings, wherein:

FIG. 4 is a fragmentary front view of the inventive front wheel drive and suspension assembly mounted on a vehicular frame.

Figure 1:
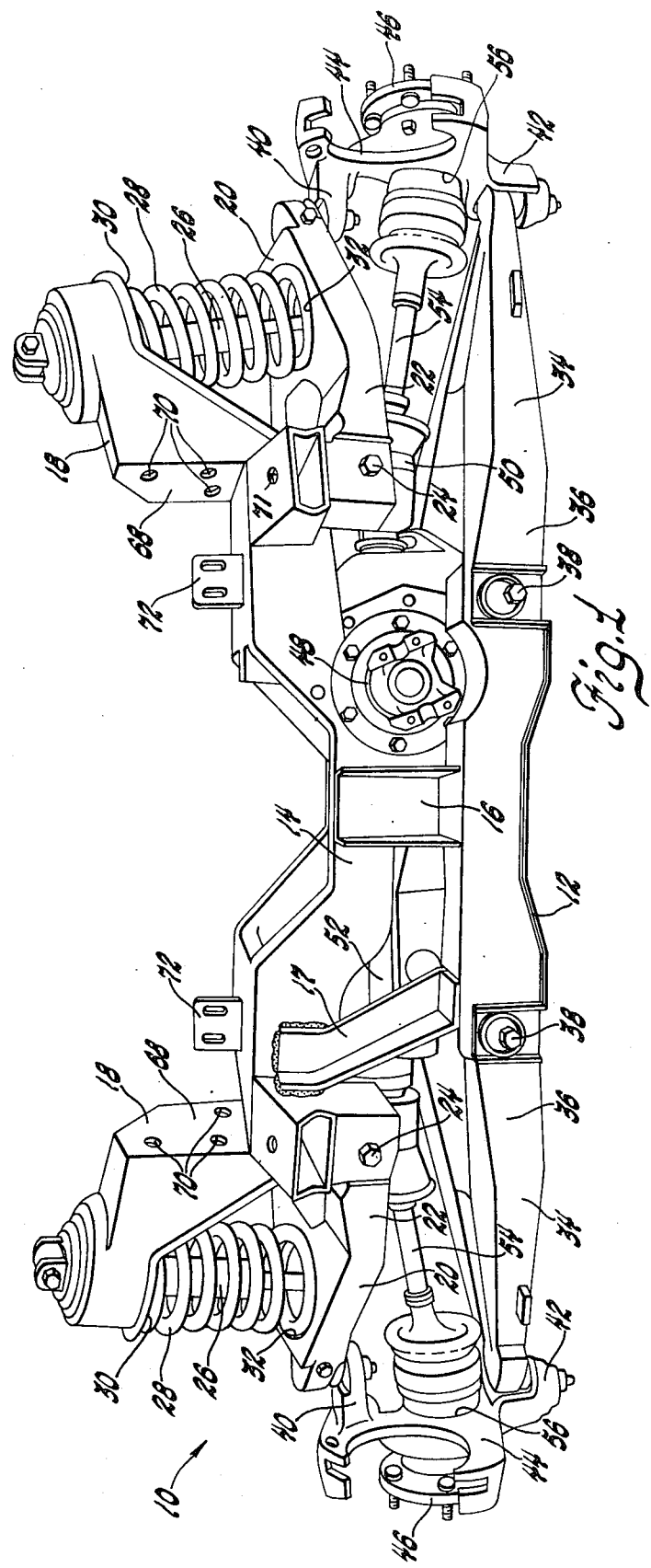
FIG. 1 is a perspective rear view of the inventive front wheel drive and suspension arrangement.

Referring now to the drawings in greater detail, FIG. 1 illustrates a unitized front drive and independent front suspension assembly 10 including a laterally extending lower cross-member 12 and a laterally extending upper support member 14 secured by means of substantially vertically extending strap members 16 and 17 to the lower cross-member 12 in any suitable manner, such as by welding.

Spring towers 18 are secured to the respective end-portions of the upper support member 14, extending upwardly and outwardly therefrom. Left and right upper control arms 20, each having a pair of legs 22 formed thereon, are mounted to straddle and extend outwardly from the respective end-portions of the upper support member 14, with the legs 22 secured by suitable means, such as bolts 24, to the front and rear surfaces of such respective end-portions. A shock absorber 26 and surrounding coil spring 28 combination is mounted between seats 30 (FIG. 4) and seats 32 (FIG. 1) formed in each of the oppositely disposed sets of spring tower 18 and upper control arm 20.

Left and right lower control arms 34, each having legs 36 formed thereon, are mounted to straddle and extend outwardly from respective end portions of the lower cross members 12, with the legs 36 pivotally secured to front and rear surfaces of such respective end portions by suitable camber and/or caster-camber adjustment means, such as cam-type bolts 38 or other conventional eccentric adjusting members. More specifically, such eccentric adjusting members serve as a means for moving both legs 36 a like distance in the same direction to adjust the camber setting, or may serve as a means for adjusting one leg 36 in one direction and the other leg 36 in the opposite direction to accomplish a caster angle adjustment. Such camber and caster adjustments are old in the art, as shown and described in U.S. Pat. No. 2,154,569, issued in the name of H. A. Hicks on Apr. 18, 1939.

The outwardly extended ends of the left- and right-hand sets of upper and lower control arms 20 and 34, are each pivotally secured to respective upper and lower support members 40 and 42 formed on each left and right steering knuckle 44. A wheel mounting plate 46 is secured to each steering knuckle 44.

A differential 48 is mounted between the lower cross-member 12 and the upper support member 14 on one side of the central strap member 16. Drive members 50 and 52, of different lengths, extend from the differential 48 beyond the respective end-portions of the lower cross-member 12, the drive member 52 extending laterally past the strap member 16. Left- and right-hand drive axles 54 extend from the ends of the respective drive members 50 and 52 to operatively connect, through openings 56 (FIG. 1) formed in the steering knuckles 44, to the respective wheel mounting plates 46.

A tie rod assembly 58 (FIG. 4), with left and right adjusting sleeves 60, is mounted between support members 62 formed on respective oppositely disposed steering knuckles 44.

Figure 2:
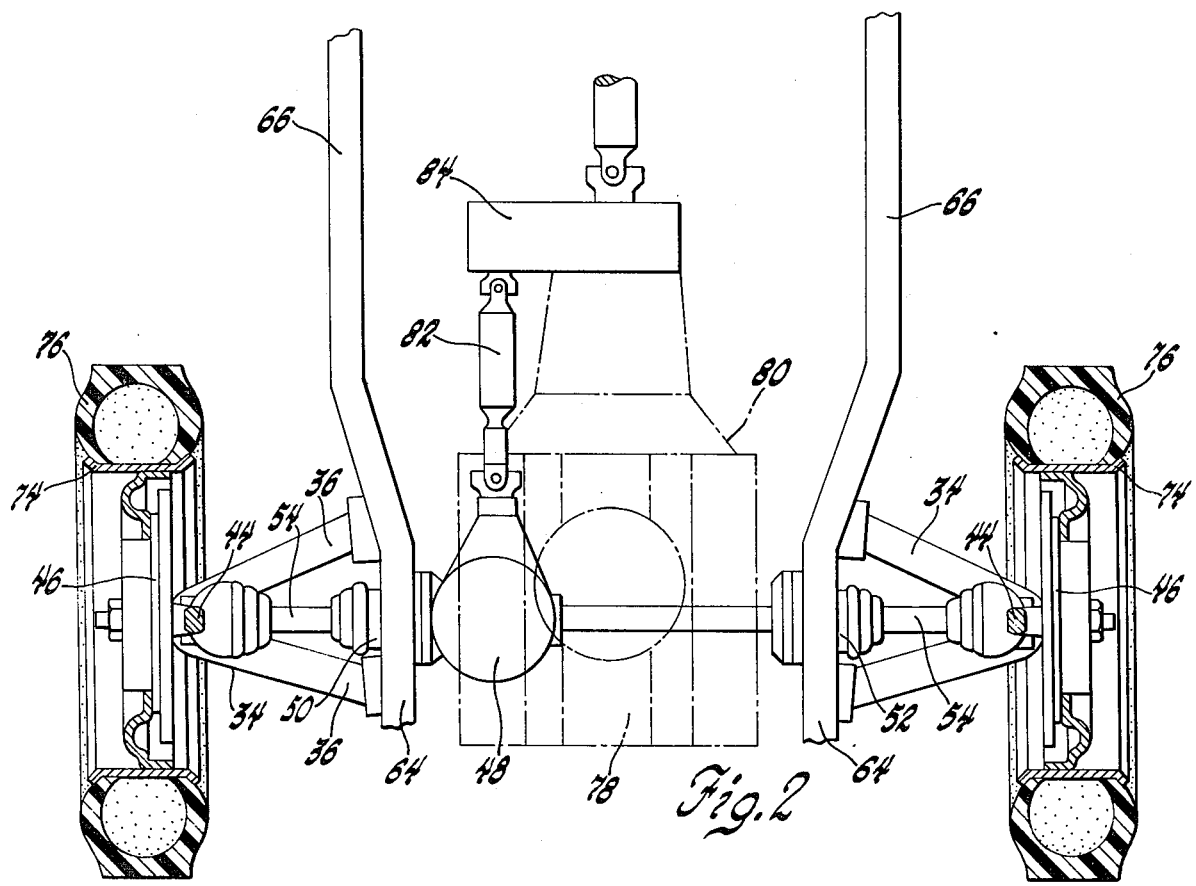
FIGS. 2 and 3 are schematic cross-sectional plan and front views, respectively, of a vehicular frame having the inventive front wheel drive and suspension assembly mounted thereon.
Figure 3:
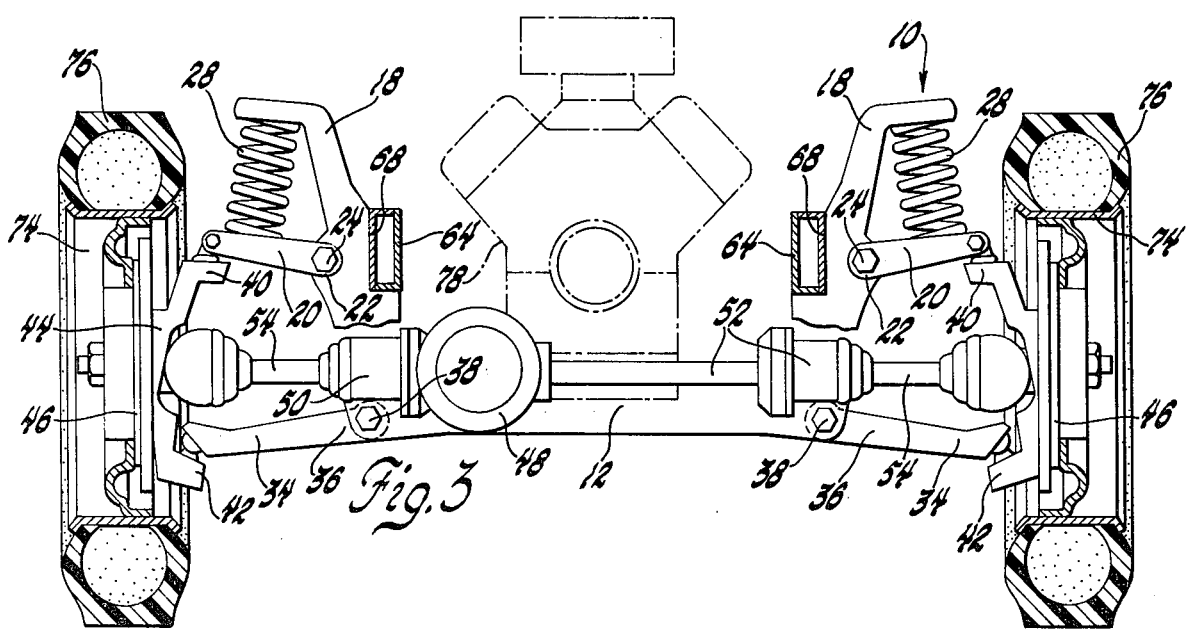

As may be noted in FIGS. 2-4, the entire unitized front drive and independent front suspension assembly 10 just described, may be mounted as one unit on the forward portions 64 of the respective frame side rails 66, with the respective inner vertical wall surfaces 68 of the spring towers 18 being adapted to abut against the side rails 66 and be secured thereto via bolts [not shown] mounted through bolt mounting openings 70 (FIG. 1). For particular vehicular applications, the forward portion of the frame side rails may bend downwardly and be secured to extended end portions of the upper support member 14 by bolts (not shown) mounted through bolt mounting openings 71. The upper support member 14 is secured to the usual engine mount brackets [not shown] via suitable mounting brackets 72 (FIG. 1) welded to the uppermost surface of the upper support member 14.

Wheels 74 and their respective tires 76 (FIGS. 2-4) may be mounted on the respective mounting plates 46 either before or after mounting the assembly 10 on the frame side rails 66.

FIGS. 3 and 2 illustrate the relationship of the front drive and suspension assembly 10 to the engine 78 and the transmission 80, respectively, with the differential 48 being operatively connected via a front propeller shaft 82 (FIG. 2) and a transfer case 84 to the transmission 80.

It should be apparent that the invention provides an improved independent front suspension system and drivetrain which are preassembled so as to be readily mounted as a unit on a vehicular frame, such as that of a light truck or recreational vehicle in lieu of a solid front axle and differential for such front wheel drive vehicles.

It should also be apparent that, if desired, a torsion bar [not shown] could be utilized in the conventional manner, i.e., operatively connected to a lower control arm, for example, in lieu of the coil spring 28 arrangement shown between the respective seats 32 and 30 formed on each upper control arm 20 and adjacent spring tower 18, but such torsion bar arrangements are not recommended for off-road type driving situations.

While but one embodiment of the invention has been shown and described, other modifications thereof are possible.

I claim:

1. For attachment to the front portion of a vehicular frame as a preassembled unit, an independent front wheel drive and suspension subassembly comprising vertically spaced upper and lower cross members extending laterally across said frame, a centrally located strap member interconnecting said cross members, a pair of steering knuckles each having a central opening and upper and lower support members formed thereon, a lower control arm pivotally connected at the ends thereof between each end of said lower cross-member and one of said lower support members, an upper control arm pivotally connected at the respective ends thereof between each end of said upper cross member and one of said upper support members, a spring tower including a vertical wall portion secured to each of the respective ends of said upper cross member and a substantially horizontal seat portion extending outwardly from said vertical wall portion, a plurality of mounting apertures formed in each of said vertical wall portions, a mounting bracket formed on the upper surface of the upper lateral cross member adjacent each end thereof a predetermined distance from said vertical wall portion, said mounting brackets and said apertured vertical wall portions adapted to receive fastener means for securing said independent front wheel drive and suspension subassembly to said front portion of said vehicular frame, a concentric coil spring and shock absorber mounted between said seat portion of each of said spring towers and the upper surface of said upper control arms, a differential mounted between said lower and upper cross members adjacent one side of said centrally located strap member, a drive axle operatively connected to each side of said differential and extending therefrom through the space between said lower and upper cross members and thence through said opening in said adjacent steering knuckle, a wheel mounting plate mounted on the end of each of said drive wheels adjacent said steering knuckle.

2. The independent front wheel drive and suspension subassembly described in claim 1, and camber adjustment means operatively associated with the pivotal connection between each of said lower control arms and said lower cross member.

* * * * *